US010061432B2

(12) United States Patent
Ahn et al.

(10) Patent No.: US 10,061,432 B2
(45) Date of Patent: Aug. 28, 2018

(54) DISPLAY DEVICE HAVING TOUCH SCREEN THEREIN

(71) Applicant: LG Display Co., Ltd., Seoul (KR)

(72) Inventors: JungEun Ahn, Daegu (KR); BoYoung Jung, Gumi-si (KR); Kyuhan Yoon, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/277,555

(22) Filed: Sep. 27, 2016

(65) Prior Publication Data

US 2017/0153746 A1 Jun. 1, 2017

(30) Foreign Application Priority Data

Nov. 30, 2015 (KR) .......................... 10-2015-0169454

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ......... G06F 3/041; G06F 3/044; G06F 3/0488
See application file for complete search history.

(56) References Cited

U.S. PATENT DOCUMENTS

| 9,046,955 | B1* | 6/2015 | Lee | G06F 3/0412 |
| 2011/0102692 | A1* | 5/2011 | Shih | G06F 3/0412 |
| | | | | 349/38 |
| 2015/0116243 | A1* | 4/2015 | Saitou | G06F 3/041 |
| | | | | 345/173 |
| 2015/0370114 | A1* | 12/2015 | Du | G02F 1/13338 |
| | | | | 349/12 |

FOREIGN PATENT DOCUMENTS

| CN | 102053410 A | 5/2011 |
| CN | 104951142 A | 9/2015 |
| JP | 2014-134982 A | 7/2014 |
| JP | 2014-149560 A | 8/2014 |
| JP | 2014-153840 A | 8/2014 |
| JP | 2014-164752 A | 9/2014 |
| JP | 2015-064854 A | 4/2015 |
| JP | 2015-079236 A | 4/2015 |
| JP | 2015-084165 A | 4/2015 |
| JP | 2015-106412 A | 6/2015 |

(Continued)

OTHER PUBLICATIONS

Office Action issued in Taiwanese Patent Application No. 105136962 dated Aug. 8, 2017.

(Continued)

*Primary Examiner* — Olga Merkoulova
(74) *Attorney, Agent, or Firm* — Polsinelli PC

(57) ABSTRACT

A display device of the present disclosure includes: an active area having a first region and a second region; a plurality of sub-pixels in the active area; a plurality of touch electrodes arranged in a matrix form and corresponding to the plurality of sub-pixels, wherein at least one of the touch electrodes in the first region has a different size from another of the touch electrodes in the second region.

15 Claims, 12 Drawing Sheets

(56) References Cited

FOREIGN PATENT DOCUMENTS

| | | |
|---|---|---|
| TW | 201504868 A | 2/2015 |
| TW | 201516821 A | 5/2015 |

OTHER PUBLICATIONS

European Search Report dated Feb. 27, 2017 issued in European Patent Application No. 16198858.9.
Office Action issued in Japanese Patent Application No. 2016-233536 dated Oct. 31, 2017.
Office Action issued in Japanese Patent Application No. 2016-233536 dated Mar. 6, 2018.

* cited by examiner

DISPLAY DEVICE HAVING TOUCH SCREEN THEREIN

CROSS REFERENCE TO RELATED APPLICATION

This application claims priority from Korean Patent Application No. 10-2015-0169454 filed in the Republic of Korea on Nov. 30, 2015, which is hereby incorporated by reference in its entirety.

BACKGROUND

Field of the Disclosure

The present disclosure relates to a display device, and more particularly, to a display device having a touch screen therein. Although the present disclosure is suitable for a wide scope of applications, it is particularly suitable for preventing degradation in luminance in the display device.

Description of the Background

With the development of the information society, display devices for displaying an image are being increasingly required in various forms, and recently, various types of display devices have been used, such as Liquid Crystal Displays (LCDs), Plasma Display Panels (PDPs), Organic Light Emitting Display Devices (OLEDs), etc.

These display devices provide a touch-based input scheme that enables a user to easily, intuitively, and conveniently input information or an instruction, and such a touch-based input scheme deviates from a conventional input scheme using a button, a keyboard, a mouse, etc.

In order to provide the touch-based input scheme, whether there is a touch done by the user must be able to be recognized, and touch coordinates must be able to be accurately detected.

To this end, in the related art, touch sensing is provided by employing one of various touch schemes, such as a resistive scheme, a capacitive scheme, an electromagnetic induction scheme, an infrared scheme, an ultrasonic scheme, etc.

Further, in the application of a touch screen to a display device, a display device having a touch sensor therein has been developed. In particular, an In-Cell type display device that uses a common electrode formed on a lower substrate as a touch electrode has been developed.

Also, since each touch electrode having the same size usually corresponds to a constant number of sub-pixels, such touch electrodes may not correspond to all the sub-pixels related to the resolution of the display device. That is, some sub-pixels may not have a touch electrode to correspond.

SUMMARY OF THE INVENTION

An aspect of the present disclosure is to provide a display device having a touch screen therein that improves degradation in luminance, caused by a difference in size between touch electrodes, by minimizing the deviation between the sizes of the first and second touch electrodes with different sizes among the touch electrodes arranged in the display panel.

Another aspect of the present disclosure is to provide a display device having a touch screen therein that prevents luminance from being degraded by a coupling effect, by changing the arrangement structure of the first and second touch electrodes with different sizes in the row direction or in the column direction.

In order to solve the problems in the related art, a display device of the present disclosure includes: an active area having a first region and a second region; a plurality of sub-pixels in the active area; a plurality of touch electrodes arranged in a matrix form and corresponding to the plurality of sub-pixels, wherein at least one of the touch electrodes in the first region has a different size from another of the touch electrodes in the second region. Therefore, degradation in luminance caused by a difference in size between the touch electrodes may decrease.

The display device having a touch screen therein, according to the present disclosure, may have an effect of minimizing a degradation in luminance, which is caused by the difference in size between the touch electrodes, by minimizing the deviation between the sizes of the first and second touch electrodes with different sizes among the touch electrodes arranged in the display panel.

In addition, the display device having a touch screen therein, according to the present disclosure, may have an effect of preventing luminance from being degraded by the coupling effect, by changing the arrangement structure of the first and second touch electrodes with different sizes in the row direction or in the column direction.

It is to be understood that both the foregoing general description and the following detailed are exemplary and explanatory and are intended to provide further explanation of the disclosure as claimed.

BRIEF DESCRIPTION OF THE DRAWINGS

The above and other objects, features, and advantages of the present disclosure will be more apparent from the following detailed description taken in conjunction with the accompanying drawings, in which.

DETAILED DESCRIPTION

Figure 1:
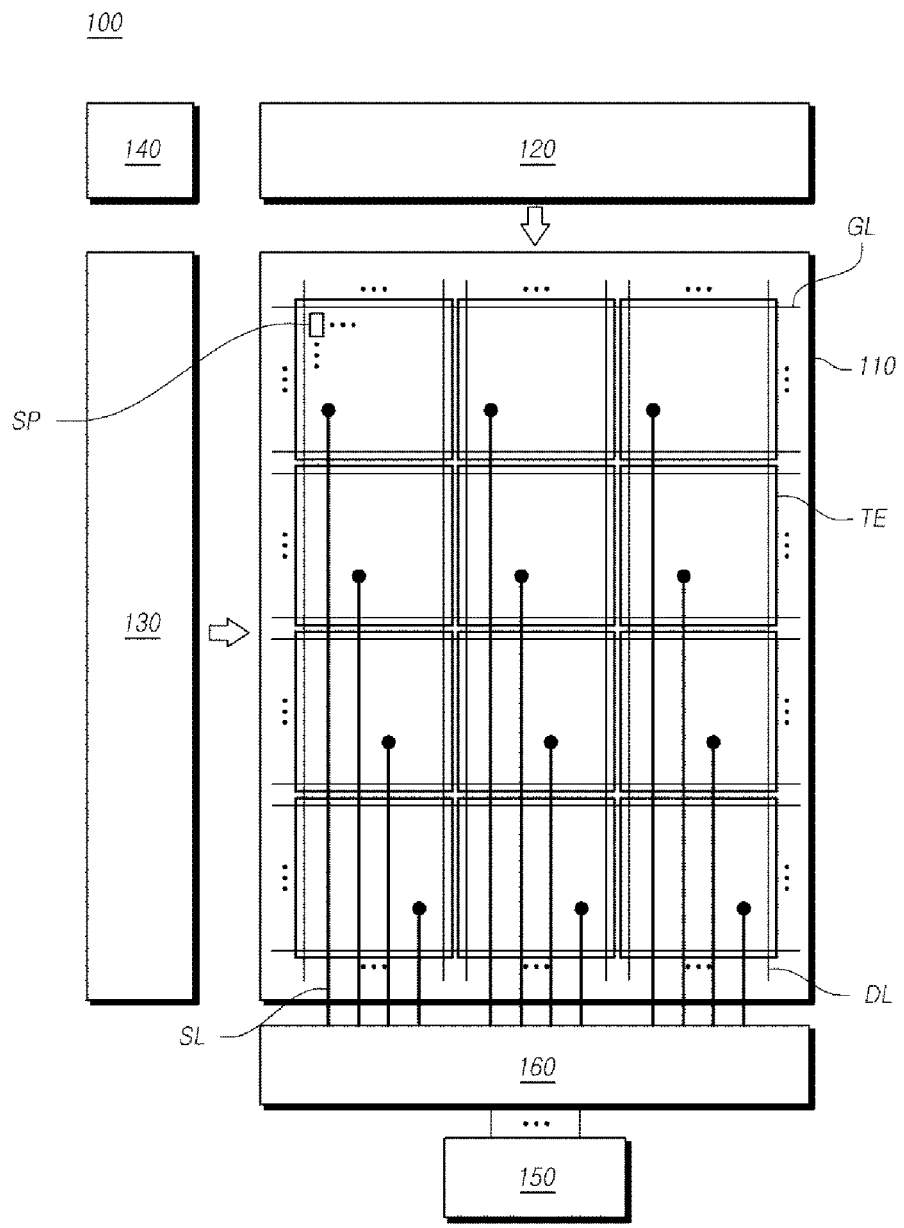
FIG. 1 is a diagram of a display device having a touch screen therein according to the present disclosure.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims.

Since shapes, sizes, rates, angles, numbers, and the like disclosed in the drawings for describing embodiments of the present disclosure are merely illustrative, the present disclosure is not limited to the illustrated matters. Throughout the specification, like reference numerals denote like elements having the same or similar functions. In describing the present disclosure, detailed descriptions related to well-known functions or configurations will be omitted when they may make subject matters of the present disclosure unnecessarily obscure.

When the terms 'comprising,' 'having,' 'including,' and the like are used in the specification, another part may be added as long as 'only' is not used. Singular forms are intended to include plural forms unless explicitly described.

In the interpretation of an element, the element should be construed as including an error range even though there is no separate explicit description.

In the description relating to a location relationship, when a location relationship between two parts is described using, for example, 'on,' 'above,' 'below,' or 'beside,' at least one other part may be located between the two parts as long as 'directly' is not used.

In the description relating to a time relationship, when a temporal precedence relationship is described using, for example, 'after,' 'subsequent to,' 'next,' or 'before,' a discontinuous case may also be included as long as 'immediately' or 'directly' is not used.

Although the terms including an ordinal number (such as first, second, etc.) may be used for describing various elements, the elements are not restricted by the terms. These terms are merely used to distinguish one element from another element. Accordingly, a first element to be mentioned below may be a second element within the scope of the present disclosure.

The features of various embodiments of the present disclosure can be partially or entirely bonded to, or combined with, each other and can be interlocked and operated in technically various ways as can be fully understood by a person having ordinary skill in the art, and the embodiments can be carried out independently of, or in association with, each other.

Hereinafter, embodiments of the present disclosure will be described in detail with reference to the accompanying drawings. In the drawings, widths, thicknesses, and the like of devices may be exaggerated for convenience. Throughout the specification, like reference numerals denote like elements having the same or similar functions.

FIG. 1 is a diagram of a display device 100 having a touch screen therein according to the present disclosure.

Referring to FIG. 1, the display device 100 having a touch screen therein, according to the present disclosure, provides an image display function (a display function) and a touch sensing function.

The display device 100 having a touch screen therein, according to the present disclosure, may be, for example, a TV having a touch sensing function for a touch input, a large and medium-sized device (such as, a monitor, etc.), or a mobile device (such as, a smart phone, a tablet PC, etc.).

Referring to FIG. 1, the display device 100 having a touch screen therein, according to the present disclosure, includes a display panel 110, a data driver 120, a gate driver 130, and a controller 140 in order to provide a display function.

The display panel 110 includes a plurality of data lines DL arranged in a first direction (e.g., in the column direction) and a plurality of gate lines GL arranged in a second direction (e.g., in the row direction).

The data driver 120 drives the plurality of data lines DL. Here, the data driver 120 is also referred to as a 'source driver.'

The gate driver 130 drives the plurality of gate lines GL. Here, the gate driver 130 is also referred to as a scan driver.

The controller 140 controls the data driver 120 and the gate driver 130. To this end, the controller 140 supplies various types of control signals to the data driver 120 and the gate driver 130.

The controller 140 starts a scan according to the timing implemented in each frame, converts image data, input from the outside, into converted image data according to the data signal format used by the data driver 120, and regulates data driving according to the scan at a proper time.

The controller 140 may be a timing controller that is used in a typical display technology, or may be a control device that includes a timing controller and additionally performs other control functions.

The gate driver 130 sequentially supplies scan signals having an On-voltage or Off-voltage to the plurality of gate lines GL according to the control of the controller 140.

The data driver 120 converts image data, received from the controller 140, into an analog form of data voltage and supplies the data voltage to the plurality of data lines DL when a specific gate line is enabled by the gate driver 130.

The data driver 120 is located only on one side (e.g., the upper or lower side) of the display panel 110 in FIG. 1. However, the data driver 120 may be located on opposite sides (e.g., the upper and lower sides) of the display panel 110 according to a driving method, a panel design method, etc.

Similarly, the gate driver 130 is located only on one side (e.g., the left or right side) of the display panel 110 in FIG. 1. However, the gate driver 130 may be located on opposite sides (e.g., the left and right sides) of the display panel 110 according to a driving method, a panel design method, etc.

The controller 140 described above receives various types of timing signals, including a vertical synchronization signal Vsync, a horizontal synchronization signal Hsync, an input Data Enable (DE) signal, a clock signal, etc., in addition to the input image data from the outside (e.g., a host system).

The display device 100 having a touch screen therein, according to the present disclosure, may be one of various types of devices, such as a liquid crystal display device, an organic light emitting display device, a plasma display device, etc. For example, the display device 100 having a touch screen therein may be an In-Plane Switching (IPS) type liquid crystal display device that displays a screen by rotating horizontally arranged liquid crystal molecules in place, which is advantageous for high resolution, low power, wide viewing angle, etc. More specifically, the display device 100 having a touch screen therein may be an Advanced High Performance-IPS (AH-IPS) type liquid crystal display device.

Each sub-pixel SP disposed in the display panel 110 may include a circuit device, such as a transistor, etc.

Meanwhile, the display device 100 having a touch screen therein, according to the present disclosure, may include a touch system for providing a touch sensing function.

Referring to FIG. 1, the touch system may include a plurality of touch electrodes TE that serve as a touch sensor and a touch circuit 150 that senses a touch by driving the plurality of touch electrodes TE.

The touch circuit 150 may sequentially drive the plurality of touch electrodes TE, by sequentially supplying touch driving signals to the plurality of touch electrodes TE.

Thereafter, the touch circuit 150 receives touch sensing signals from the touch electrodes to which the touch driving signals have been applied.

The touch circuit 150 may compute the presence or absence of a touch and touch coordinates on the basis of the touch sensing signals received from the plurality of touch electrodes TE.

Here, the touch driving signals may have, for example, the waveform of a pulse modulation signal that has two or more voltage levels.

The touch sensing signals received from the plurality of touch electrodes TE may vary depending upon whether a touch is generated near the corresponding touch electrodes by a pointer, such as a finger, a pen, etc.

The touch circuit 150 may identify the presence or absence of a touch and touch coordinates by detecting variations in capacitance (or variations in the voltage or the quantity of electric charges) between the touch electrodes TE on the basis of the touch sensing signals.

Referring to FIG. 1, in order to supply touch driving signals to the plurality of touch electrodes TE, respectively, sensing lines SL are connected to the respective touch electrodes TE.

Further, in order to sequentially supply the touch driving signals to the plurality of touch electrodes TE, the touch system may further include a switch circuit 160 that sequentially connects the sensing lines SL, which are connected to the plurality of touch electrodes TE, respectively, to the touch circuit 150.

The switch circuit 160 may be configured with at least one multiplexer.

Meanwhile, referring to FIG. 1, each of the plurality of touch electrodes TE, may have a block shape.

Further, each touch electrode TE may have a size that is equal to or corresponds to that of one sub-pixel area.

Though unlikely, as illustrated in FIG. 1, each touch electrode TE may have a size that is larger than that of one sub-pixel area.

Namely, the area of each touch electrode TE may have a size that corresponds to two or more sub-pixel areas.

Meanwhile, referring to FIG. 1, the plurality of touch electrodes TE described above may be embedded in the display panel 110.

In this sense, it can be said that the display panel 110 has a touch screen or touch screen panel therein. Namely, the display panel 110 may be an In-Cell or On-Cell type display panel that has a touch screen therein.

Meanwhile, the display device 100 having a touch screen therein, according to the present disclosure, may operate in a display mode in order to provide a display function and may operate in a touch mode in order to provide a touch sensing function.

In this regard, the plurality of touch electrodes TE may operate as a touch sensor in the touch mode, but may be used as display electrodes in the display mode.

For example, in the display mode, the plurality of touch electrodes TE may operate as common electrodes, to which a common voltage Vcom is applied, as an example of the display electrodes.

Here, the common voltage Vcom corresponds to a pixel voltage that is applied to pixel electrodes.

Meanwhile, the plurality of touch electrodes TE embedded in the display panel 110 may be arranged in the form of a j×i matrix (j≥2 and i≥2) as illustrated in FIG. 1.

Figure 2:
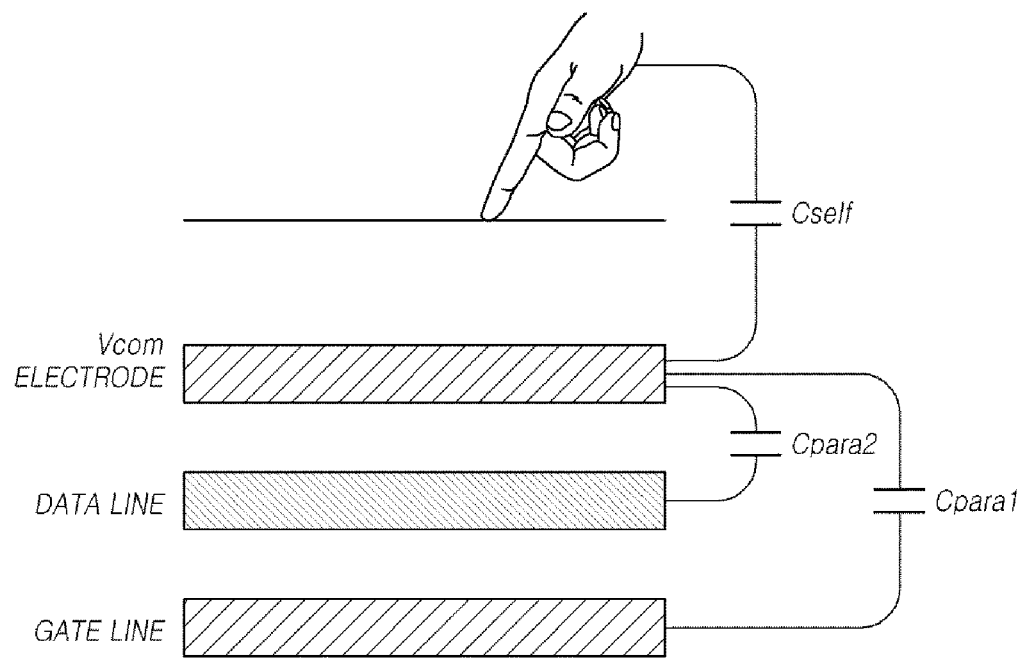
FIG. 2 is a diagram illustrating capacitance components Cself, Cpara1, and Cpara2 that are generated when the display device having a touch screen therein, according to the present disclosure, is in a touch mode.

FIG. 2 is a diagram illustrating capacitance components Cself, Cpara1, and Cpara2 that are generated when the display device 100 having a touch screen therein, according to the present disclosure, is in a touch mode.

Referring to FIG. 2, the plurality of touch electrodes TE serves as common electrodes (Vcom electrodes) that respectively form liquid crystal capacitors together with the pixel electrodes in a display mode, and serves as touch electrodes that form the self-capacitance Cself together with a pointer (such as a finger, a pen, etc.) in a touch mode in order to detect the presence or absence of a touch, touch coordinates, and the like.

Meanwhile, the plurality of touch electrodes TE serving as common electrodes may form parasitic capacitance components Cpara1 and Cpara2 together with the gate lines and data lines, but the parasitic capacitance components are negligibly small as compared with the self-capacitance.

Hereinafter, the following will be described in more detail: the display panel 110 that is included in the display device 100 having a touch screen therein according to an embodiment of the present disclosure; a method of applying a common voltage and touch driving signals to the plurality of touch electrodes TE11 to TE14, TE21 to TE24, and TE31 to TE34 that serve as common electrodes and touch electrodes; a method of applying data voltages and touch driving signals (or signals corresponding thereto) to the data lines DL; a method of applying data voltages and touch driving signals (or signals corresponding thereto) to the gate lines GL; and the like.

Figure 3:
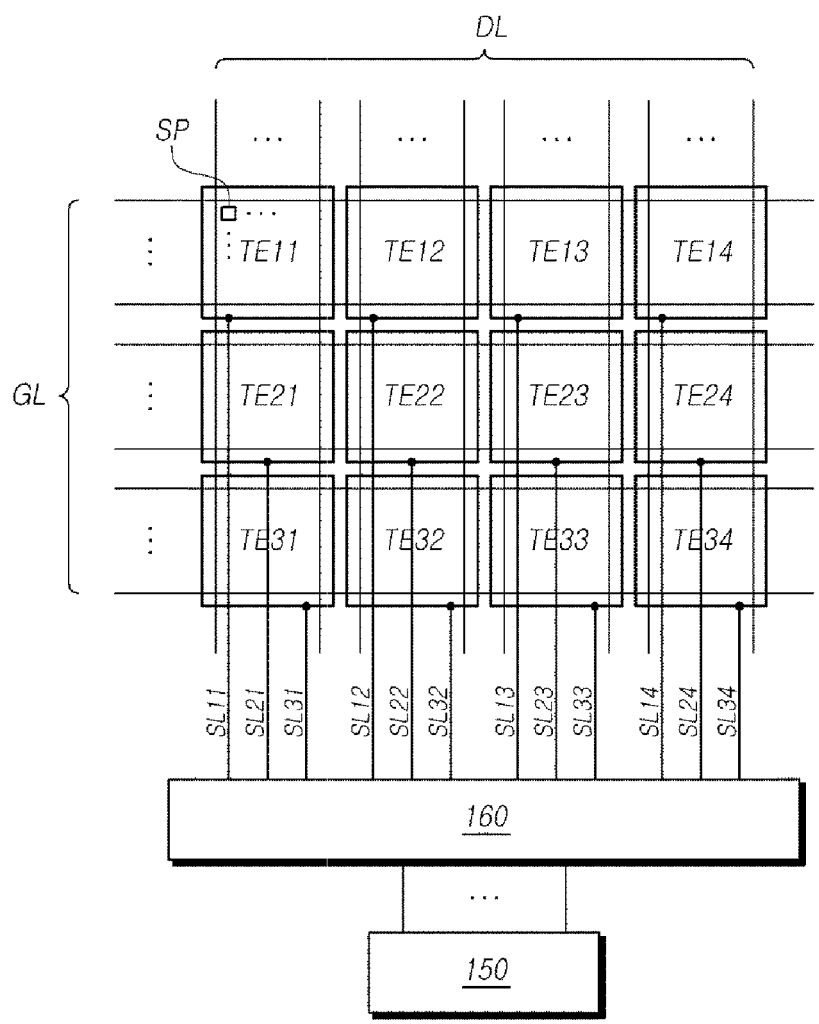
FIG. 3 is a plan view of a display panel that is included in the display device having a touch screen therein according to the present disclosure.

FIG. 3 is a plan view of the display panel that is included in the display device having a touch screen therein according to the present disclosure.

Referring to FIG. 3, the plurality of data lines DL, the plurality of gate lines GL, and the plurality of touch electrodes TE11 to TE14, TE21 to TE24, and TE31 to TE34 are formed in the display panel 110 as described above.

Further, the display panel 110 may operate in a display mode and in a touch mode as described above.

In this regard, the plurality of data lines DL and the plurality of gate lines GL, which are formed in the display panel 110, are configurations for allowing the display panel 110 to serve as a display panel.

Further, the plurality of touch electrodes TE11 to TE14, TE21 to TE24, and TE31 to TE34, which are formed in the display panel 110, are configurations for allowing the display panel 110 to serve as a display panel as well as a touch screen panel.

More specifically, when the display panel 110 serves as a display panel, that is, when the display panel 110 is driven in a display mode, the plurality of touch electrodes TE11 to TE14, TE21 to TE24, and TE31 to TE34 operates as common electrodes (or also referred to as "Vcom electrodes"), which faces the pixel electrodes (the first electrodes, not illustrated), with a common voltage Vcom applied thereto.

Further, when the display panel 110 serves as a touch screen panel, that is, when the display panel 110 is driven in a touch mode, the plurality of touch electrodes TE11 to TE14, TE21 to TE24, and TE31 to TE34 forms capacitors together with a touch pointer (e.g., a finger, a pen, etc.) with a touch driving voltage applied thereto and operates as "touch electrodes" from which the capacitances of the capacitors, formed in such a way, are measured.

In other words, the plurality of touch electrodes TE11 to TE14, TE21 to TE24, and TE31 to TE34 serves as common electrodes (Vcom electrodes) in the display mode and as touch electrodes in the touch mode.

In the display mode, a common voltage Vcom is applied to the plurality of touch electrodes TE11 to TE14, TE21 to TE24, and TE31 to TE34, and in the touch mode, touch driving signals are applied to the plurality of touch electrodes TE11 to TE14, TE21 to TE24, and TE31 to TE34.

As illustrated in FIG. 3, sensing lines SL11 to SL14, SL21 to SL24, and SL31 to SL34 may be connected to the plurality of touch electrodes TE11 to TE14, TE21 to TE24, and TE31 to TE34 to transfer the common voltage or the touch driving signals to the plurality of touch electrodes TE11 to TE14, TE21 to TE24, and TE31 to TE34.

Accordingly, in the touch mode, the touch driving signals Vtd, which are generated by the touch circuit 150 and the switch circuit 160, are transferred to all or some of the plurality of touch electrodes TE11 to TE14, TE21 to TE24, and TE31 to TE34 through the sensing lines SL11 to SL14, SL21 to SL24, and SL31 to SL34, and in the display mode, the common voltage Vcom, which is supplied from a common voltage supply unit (not illustrated), is applied to the plurality of touch electrodes TE11 to TE14, TE21 to TE24, and TE31 to TE34 through the sensing lines SL11 to SL14, SL21 to SL24, and SL31 to SL34.

Referring to FIG. 3, sub-pixels SP are arranged in a matrix form in an active area, and one sub-pixel SP is defined to correspond to each of the points where the plurality of data lines DL and the plurality of gate lines GL, which are formed in the display panel 110, cross each other. Here, the sub-pixel may be one of a red (R) sub-pixel, a green (G) sub-pixel, a blue (B) sub-pixel, and a white (W) sub-pixel.

Referring to FIG. 3, the touch electrodes TE11 to TE14, TE21 to TE24, and TE31 to TE34 are arranged in a matrix form and correspond to all the sub-pixels. Specifically, two or more sub-pixels SP may be defined in an area (hereinafter, also referred to as "unit touch electrode area") where each of the plurality of touch electrodes TE11 to TE14, TE21 to TE24, and TE31 to TE34, which serves as a common electrode and as a touch electrode, is formed. That is, one of the plurality of touch electrodes TE11 to TE14, TE21 to TE24, and TE31 to TE34 corresponds to two or more sub-pixels SP.

For example, 24×3 data lines DL and 24 gate lines GL may be arranged to define 24×3×24 sub-pixels SP in one area (unit touch electrode area) where each of the plurality of touch electrodes TE11 to TE14, TE21 to TE24, and TE31 to TE34, which serves as a common electrode and as a touch electrode, is formed.

Meanwhile, as illustrated in FIG. 3, each of the plurality of touch electrodes TE11 to TE14, TE21 to TE24, and TE31 to TE34, which serves as a common electrode and as a touch electrode, may be a block-shaped pattern, or may be a pattern that includes a comb-shaped pattern in the area corresponding to each sub-pixel SP.

The present disclosure may also be applied to the case where each of the plurality of touch electrodes TE11 to TE14, TE21 to TE24, and TE31 to TE34, which serves as a common electrode and as a touch electrode, is a pattern that includes a comb-shaped portion.

Figure 4:
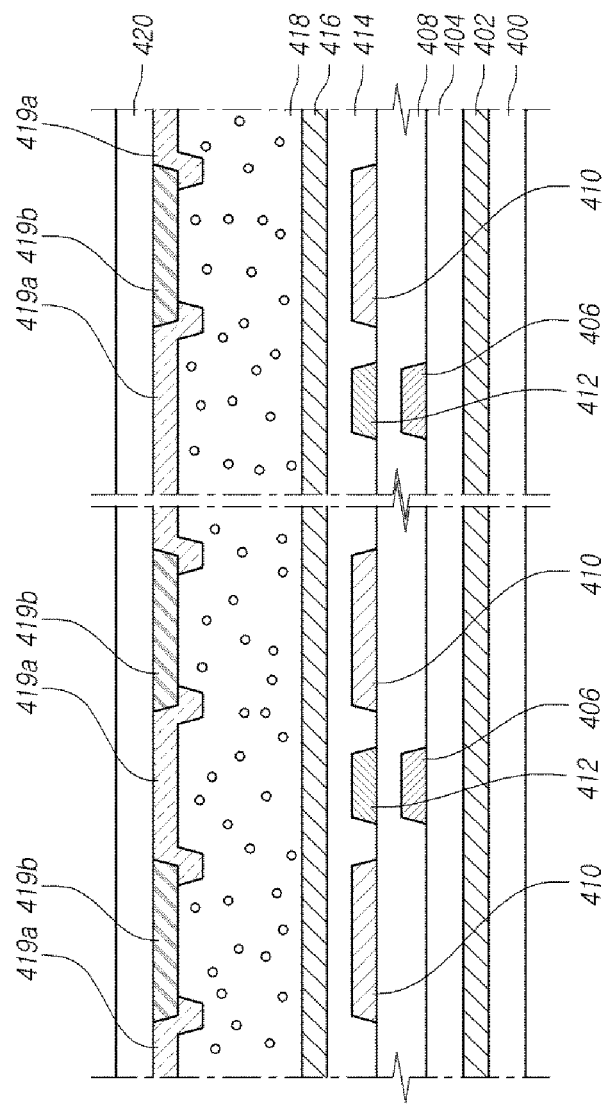
FIG. 4 is an exemplary cross-sectional view of a display panel according to an embodiment of the present disclosure in a case where the display device having a touch screen therein is a liquid crystal display device.

FIG. 4 is an exemplary cross-sectional view of a display panel according to an embodiment of the present disclosure in a case where the display device 100 having a touch screen therein is a liquid crystal display device.

FIG. 4 is a cross-sectional view illustrating an area (i.e., unit touch electrode area) where one of the plurality of touch electrodes TE11 to TE14, TE21 to TE24, and TE31 to TE34, which serves as a common electrode and as a touch electrode, is formed.

Referring to FIG. 4, the display panel 110, which is included in the display device 100 having a touch screen therein, includes, for example, gate lines 402 formed on a lower substrate 400 in a first direction (the horizontal direction, namely, the left-right direction in FIG. 3), and a gate insulation layer 404 formed on the gate lines 402.

Data lines 406 are formed on the gate insulation layer 404 in a second direction (the vertical direction, namely, the direction perpendicular to the ground in FIG. 3), and a first protection layer 408 is formed on the data lines 406.

Pixel electrodes 410 and sensing lines 412 of each sub-pixel area may be formed on the first protection layer 408, and a second protection layer 414 may be formed on the pixel electrodes 410 and the sensing lines 412. Here, the sensing lines 412 are connected between the switch circuit 160 and the plurality of touch electrodes TE11 to TE14, TE21 to TE24, and TE31 to TE34, which serves as common electrodes and as touch electrodes, to transfer a common voltage Vcom, generated by the common voltage supply unit, to the plurality of touch electrodes TE11 to TE14, TE21 to TE24, and TE31 to TE34 in a display mode and transfer touch driving signals, generated by the touch circuit 150 and the switch circuit 160, to the plurality of touch electrodes TE11 to TE14, TE21 to TE24, and TE31 to TE34 in a touch mode.

One electrode 416 that serves as a common electrode and as a touch electrode is formed on the second protection layer 414, and a liquid crystal layer 418 is formed on the electrode 416. Here, the electrode 416, which serves as a common electrode and a touch electrode, may has a pattern having a block shape, as one of the plurality of touch electrodes TE11 to TE14, TE21 to TE24, and TE31 to TE34.

An upper substrate 420, on which a black matrix 419a, color filters 419b, and the like are formed, is located on the liquid crystal layer 418.

Although the liquid crystal display device has been described above with reference to FIG. 4, the present disclosure may be applied to various types of display devices capable of being coupled with a touch panel without being limited thereto.

Figure 5:
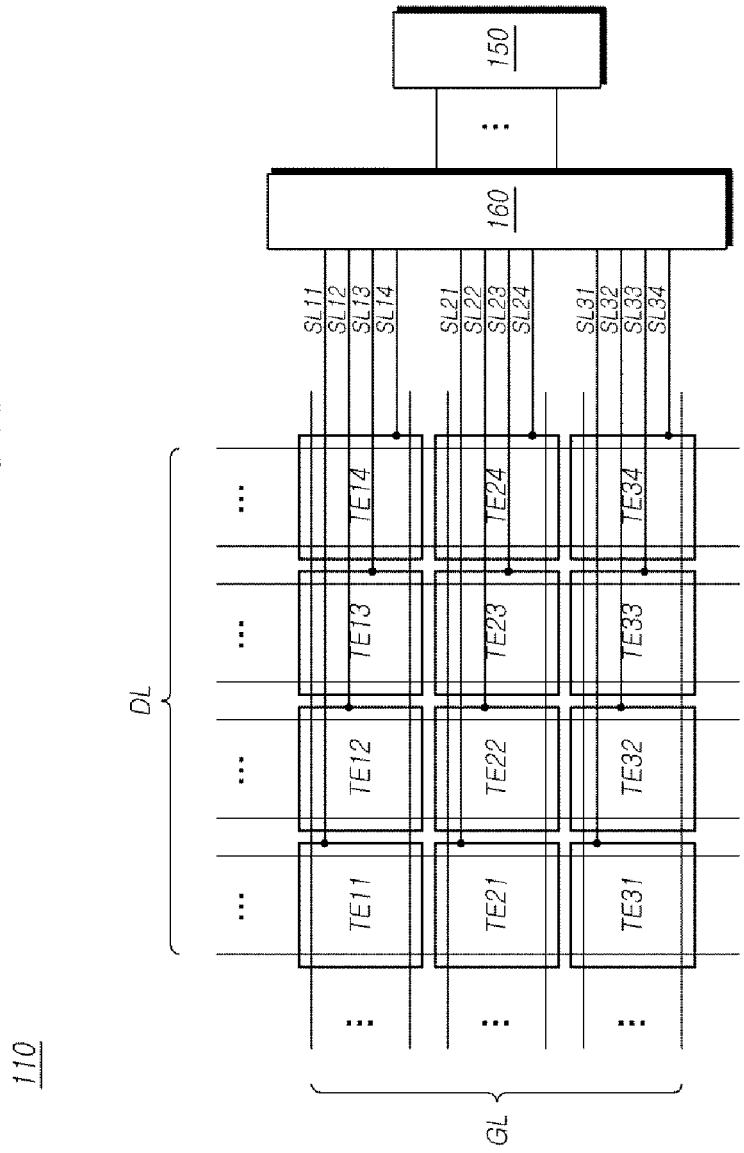
FIG. 5 is another plan view of the display panel that is included in the display device having a touch screen therein according to the present disclosure.

FIG. 5 is another plan view of the display panel that is included in the display device 100 having a touch screen therein according to the present disclosure.

Referring to FIG. 5, the sensing lines SL11 to SL14, SL21 to SL24, and SL31 to SL34, which are connected to the plurality of touch electrodes TE11 to TE14, TE21 to TE24, and TE31 to TE34, respectively, to transfer the touch driving signals or the common voltage, may be formed parallel to the second direction (e.g., the horizontal direction) in which the gate lines GL are formed, differently from that illustrated in FIG. 3.

In this case, the touch driving signals generated by the touch circuit 150 and the switch circuit 160 of FIG. 1 or the common voltage generated and supplied by the common voltage supply unit may be transferred to all or some of the plurality of touch electrodes TE11 to TE14, TE21 to TE24, and TE31 to TE34 through the sensing lines SL11 to SL14, SL21 to SL24, and SL31 to SL34 that are formed parallel to the gate lines.

A thin film transistor disposed on each sub-pixel SP of the present disclosure may be, for example, an amorphous silicon (hereinafter, referred to as 'a-Si') transistor or a metal oxide and poly silicon transistor. The poly silicon is not limited to include a low temperature poly-silicon (hereinafter, referred to as 'LTPS') and a high temperature polysilicon (hereinafter, referred to as 'HTPS').

However, it is difficult to form only touch electrodes each corresponding to the same number of sub-pixels on the display panel according to the resolution of the display device. This is because each touch electrode should correspond to a predetermined number of sub-pixels but there may be a difference between the predetermined number of sub-pixels to which a touch electrode should correspond and the number of sub-pixels to which a touch electrode actually corresponds. For example, in a case where the total number of sub-pixels SP corresponding to a touch electrode is 200, if there are 50 sub-pixels remaining, a touch electrode corresponding to 200 sub-pixels has to be additionally disposed for the remaining sub-pixels.

Accordingly, in order to solve the problem, touch electrodes having a different size are designed and arranged according to the difference between the number of sub-pixels in the column direction which the number of touch electrodes having the same size should correspond to, and the number of sub-pixels in the column direction which these touch electrodes actually correspond to.

To this end, in an embodiment, the above active area is defined to include at least a first region and a second region. Specifically, the first region is exemplary the uppermost region of the active area, and the second region is exemplary the other region of the active area. In this case, at least one of the touch electrodes in the first region may have a different size from another of the touch electrodes in the second region. That is, the number of sub-pixels corresponding to the touch electrode in the first region is different from the number of sub-pixels corresponding to the touch electrode in the second region.

Alternatively, the above active area further includes a third region, and the second region is exemplary between the first and third regions. Specifically, the first region is exemplary the uppermost region of the active area, the second region is exemplary the central region of the active area, and the third region is exemplary the lowermost region of the active area. In this case, at least one of the touch electrodes in the first region may have a different size from another of the touch electrodes in the second region, and/or at least one of the touch electrodes in the third region may have a different size from another of the touch electrodes in the second region. That is, the number of sub-pixels corresponding to the touch electrode in the second region is different from the number of sub-pixels corresponding to the touch electrode in the first region and/or the number of sub-pixels corresponding to the touch electrode in the third region.

Further, the number of sub-pixels corresponding to the touch electrode in the first region can be the same as the number of sub-pixels corresponding to the touch electrode in the third region.

These various embodiments of the arrangements of touch electrodes with different sizes will be exemplary described in detail below.

Figure 6A:
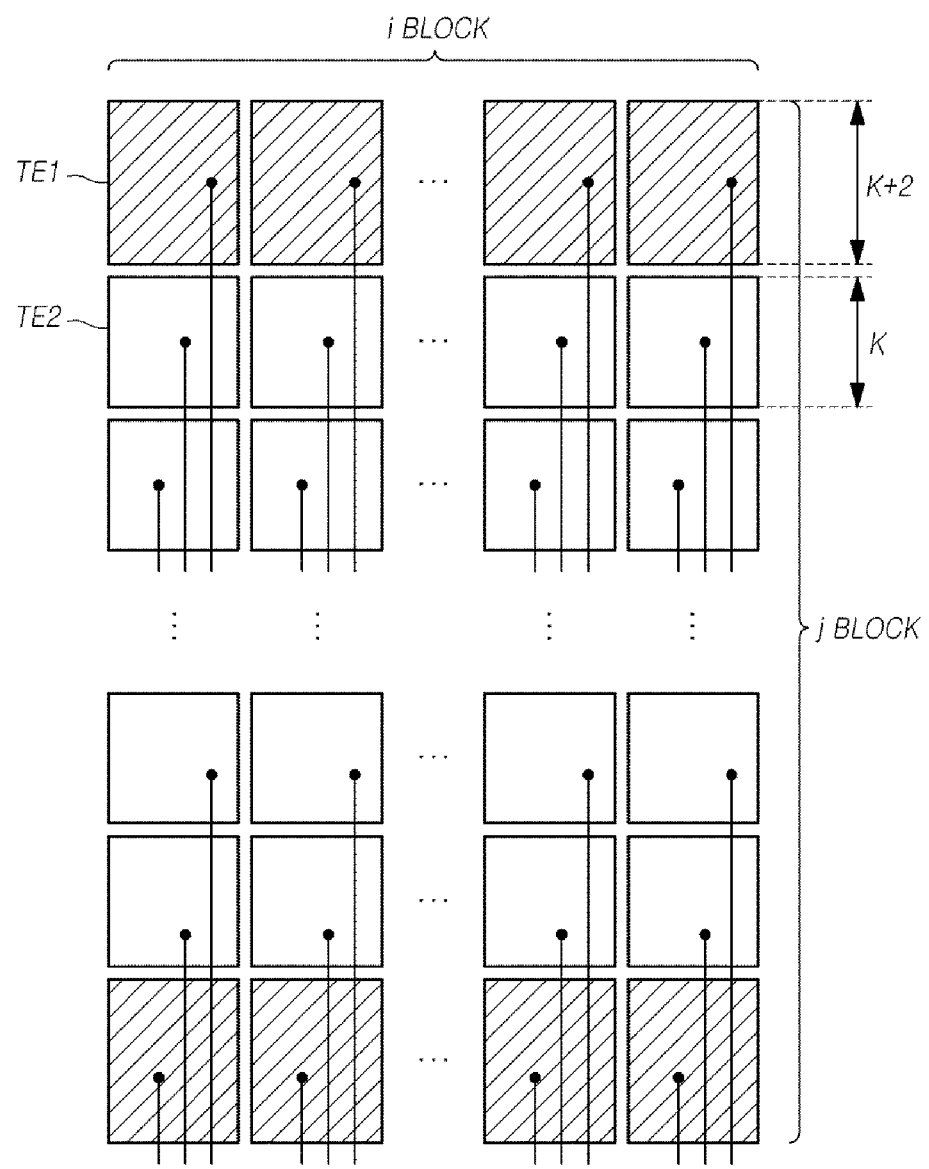
FIG. 6A is a diagram illustrating a touch electrode structure of the display device having a touch screen therein.
Figure 6B:
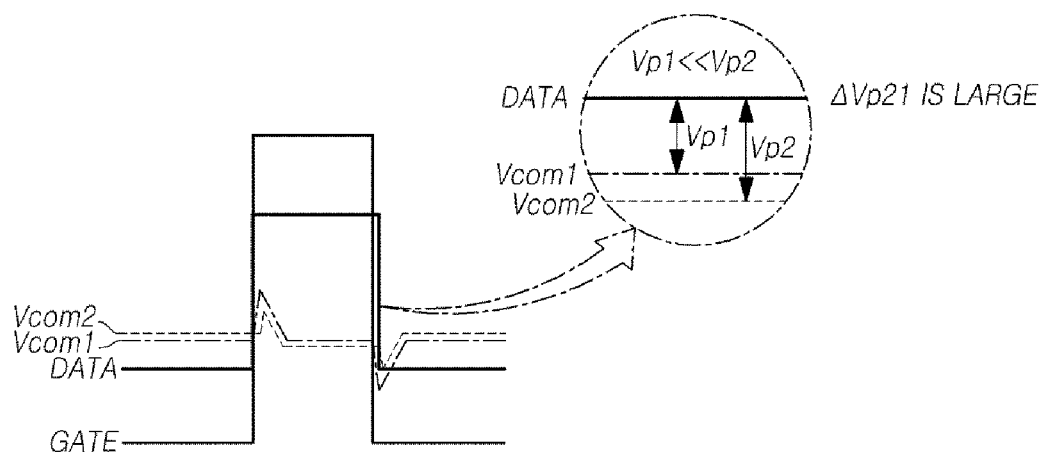
FIG. 6B is a diagram illustrating a voltage difference between touch electrodes of the display device having a touch screen therein.

FIG. 6A is a diagram illustrating a touch electrode structure of the display device having a touch screen therein, and FIG. 6B is a diagram illustrating a voltage difference ($\Delta$Vp21) between touch electrodes of the display device having a touch screen therein.

Referring to FIGS. 6A and 6B, a plurality of touch electrodes TE, serving as common electrodes, are arranged in the form of a block in the display device having a touch screen therein according to the present disclosure.

Touch electrode blocks corresponding to i columns (i≥2) are arranged in the column direction on the display panel, and touch electrode blocks corresponding to j rows (j≥2) are arranged in the row direction.

In an embodiment, the number of sub-pixels corresponding to the touch electrode in the first region is larger than the number of sub-pixels corresponding to the touch electrode in the second region, and the number of sub-pixels corresponding to the touch electrode in the third region is larger than the number of sub-pixels corresponding to the touch electrode in the second region. The number of sub-pixels corresponding to each touch electrode in the first region is the same, the number of sub-pixels corresponding to each touch electrode in the second region is the same, and the number of sub-pixels corresponding to each touch electrode in the third region is the same.

As illustrated in FIG. 6A, first touch electrodes TE1 which are larger in size than second touch electrodes TE2, are arranged in the uppermost and lowermost positions of the display panel, that is, in the first row and in the last row (the j-th row), and the second touch electrodes TE2 are arranged in the other rows (j-2 rows).

The first touch electrode TE1 has a larger area than the second touch electrode TE2. Specifically, the number of sub-pixels in the vertical column that corresponds to the first touch electrode TE1 is K+n while the number of sub-pixels in the vertical column that corresponds to the second touch electrode TE2 is K, where n is a natural number that is not limited to be 1 or 2. Although the embodiment as shown in FIG. 6A is exemplary based on the case of n being 2, it will not be limited thereto. For example, if the number of sub-pixels SP corresponding to the first touch electrode TE1 in the column direction is 36, the number of sub-pixels SP corresponding to the second touch electrode TE2 in the column direction is 34. That is, the number of sub-pixels corresponding to the first touch electrode TE1 is larger than the number of sub-pixels corresponding to the second touch electrode TE2 by about two rows. Therefore, it is possible to adjust the number of sub-pixels corresponding to the first touch electrode TE1 and then, the remaining sub-pixels may be covered by the first touch electrode TE1.

However, if the touch electrodes TE have different areas (sizes), the capacitance varies, which leads to a difference in the common voltage Vcom between the touch electrodes. Due to this, the pixel voltage Vp1 of the sub-pixels corresponding to the first touch electrode TE1 and the pixel voltage Vp2 of the sub-pixels corresponding to the second touch electrode TE2 also vary, which causes a degradation in luminance.

Referring to FIG. 6B, the capacitance between the first touch electrode TE1 and the gate (the gate electrode and the gate lines) located there below becomes larger than the capacitance between the second touch electrode TE2 and the gate located there below because the first touch electrode TE1 is larger than the second touch electrode TE2.

Due to this, even though the first common voltage Vcom1 supplied to the first touch electrode TE1 is lower than or equal to the second common voltage Vcom2 supplied to the second touch electrode TE2, the first common voltage Vcom1 exceeds the second common voltage Vcom2 on account of the coupling effect when a gate voltage Gate (scan signal) is supplied.

The change in the common voltage results in that the pixel voltage Vp1 in the first touch electrode area is lower than the pixel voltage Vp2 in the second touch electrode area, thereby causing a degradation in luminance.

As illustrated in the drawing, the pixel voltage Vp2 of the second touch electrodes 1E2 is higher than the pixel voltage Vp1 of the first touch electrodes TE1 (Vp1<<Vp2; ΔVp21 is large), so that a problem of darkness happens in the rows (in the uppermost and lowermost rows) where the first touch electrodes TE1 are arranged.

In the present disclosure, the coupling effect that occurs between the touch electrodes is minimized by reducing the deviation in size between the touch electrodes that are arranged in the display device having a touch screen therein, thereby preventing a degradation in luminance.

Further, in the present disclosure, the touch electrodes having different sizes (areas), which are arranged in the display device having a touch screen therein, are arranged to be intermingled with each other in the column direction and in the row direction, thereby minimizing non-uniform luminance caused by the difference in capacitance between the touch electrodes.

Figure 7:
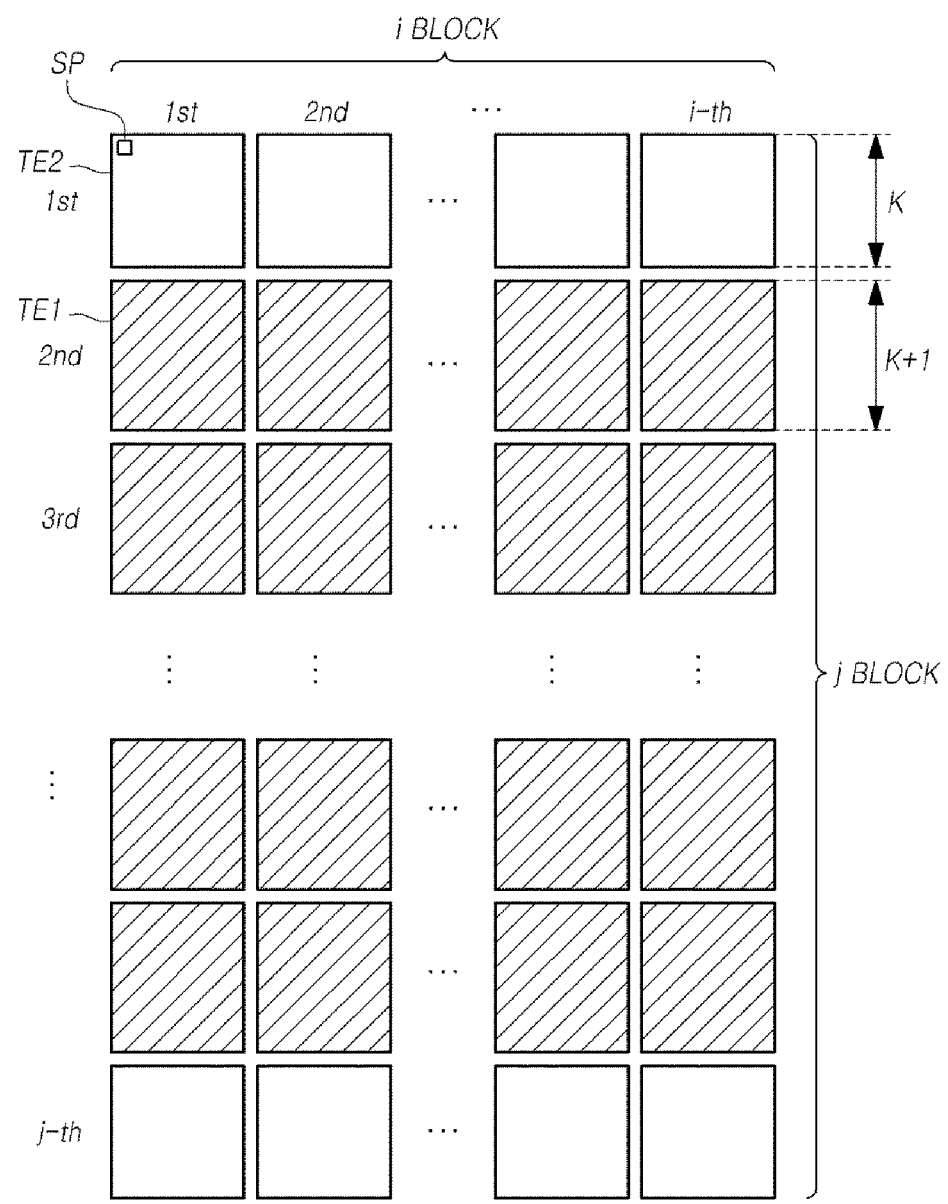
FIG. 7 is a diagram illustrating a touch electrode structure of the display device having a touch screen therein according to the present disclosure.

FIG. 7 is a diagram illustrating a touch electrode structure of the display device having a touch screen therein according to the present disclosure.

Referring to FIGS. 1 and 7, the display device 100 having a touch screen therein, according to the present disclosure, has the display panel 110 in which the plurality of sub-pixels SP are arranged, and the sub-pixels SP are defined by the plurality of data lines that are arranged in the first direction and the plurality of gate lines that are arranged in the second direction.

Touch electrode blocks corresponding to i columns (i≥2) and touch electrode blocks corresponding to j rows (j≥2) are arranged in the display panel 110. In an embodiment, the number of sub-pixels corresponding to the touch electrode in the first region is smaller than the number of sub-pixels corresponding to the touch electrode in the second region, and the number of sub-pixels corresponding to the touch electrode in the third region is smaller than the number of sub-pixels corresponding to the touch electrode in the second region. Also, the number of sub-pixels corresponding to each touch electrode in the first region is the same, the number of sub-pixels corresponding to each touch electrode in the second region is the same, and the number of sub-pixels corresponding to each touch electrode in the third region is the same.

In practice, touch electrodes TE include a plurality of first touch electrodes TE1 and a plurality of second touch electrodes TE2, which have different areas (sizes).

The first touch electrodes TE1 are larger than the second touch electrodes TE2, and the second touch electrodes TE2 are arranged adjacent to each other in the row direction in the uppermost and lowermost rows of the display panel 110.

The first touch electrodes TE1, which are larger than the second touch electrodes TE2, are arranged adjacent to each other in the row direction in the second and third rows that are close to the uppermost (first) row.

In the same way, the first touch electrodes TE1, which are larger than the second touch electrodes TE2, are arranged adjacent to each other in the (j-1)th and (j-2)th rows that are close to the lowermost (j-th) row.

For example, when the touch electrode blocks have j rows, the second touch electrode blocks may be arranged in the first row and in the last (j-th) row, and the first touch electrode blocks, which are larger than the second touch electrode blocks, may be arranged between the first row and the last row.

Further, since the first touch electrodes TE1, which are larger than the second touch electrodes TE2, are arranged by adjusting the number of sub-pixels in the vertical column direction that correspond thereto, the same number of first touch electrodes TE1 are arranged in each of the i columns of the display panel.

Moreover, the number of sub-pixels SP that correspond to the first touch electrode TE1 is larger than the number of sub-pixels SP that correspond to the second touch electrode TE2, and it is desirable that a difference between the number of sub-pixels in the vertical column direction that corresponds to the first touch electrode TE1 and the number of sub-pixels in the vertical column direction that corresponds to the second touch electrode TE2 is equal to one or two.

For example, if the number of sub-pixels arranged along the vertical column of the second touch electrode TE2 is K, the number of sub-pixels arranged along the vertical column of the first touch electrode TE1 is K+n, where n preferably has a value of 1 or 2. Although it is illustrated in this specification that n is 1, n may be diversely changed according to the size and model resolution of the display device. Accordingly, n may be 1 or 2, but is not limited thereto.

As illustrated in FIG. 7, the second touch electrodes TE2 may be arranged adjacent to each other in the first and last rows, namely, in the first and j-th rows of the display panel 110, and the first touch electrode TE1 may be arranged adjacent to each other in the second and third rows.

In the same way, the first touch electrodes TE1 may be arranged adjacent to each other in the (j-1)th and (j-2) rows prior to the j-th row of the display panel 110.

Further, since the number of sub-pixels SP corresponding to the vertical column of the first touch electrode TE1 and the number of sub-pixels SP corresponding to the vertical column of the second touch electrode TE2 are K+1 and K, respectively, and the difference there between is 1, the deviation in size between the first and second touch electrodes TE1 and TE2 is reduced.

In the present disclosure, the first touch electrodes TE1 having a different (large) size are not arranged on the uppermost and lowermost edges of the display panel, which minimizes the coupling effect caused by the size deviation.

For example, since touch electrodes arranged in the uppermost and lowermost positions of the display panel have no adjacent upper and lower touch electrodes as opposed to other touch electrodes arranged in the central region, so that the deviation in capacitance is generated between the touch electrodes in the uppermost and lowermost positions and the other touch electrodes in the central region. Further, if touch electrodes (e.g. first touch electrodes) having a different size are arranged in the uppermost and lowermost positions of the display panel, the coupling effect caused by the deviation in size between the touch electrodes becomes more serious in addition to the above structural deviation, so the first touch electrodes TE1 having a larger size are not disposed in the uppermost and lowermost positions of the display panel in the present disclosure.

Accordingly, the display device having a touch screen therein, according to the present disclosure, has an effect of improving a degradation in luminance caused by a difference in size between touch electrodes, by minimizing the deviation in size between the touch electrodes with different sizes among the touch electrodes arranged in the display panel.

In addition, the display device having a touch screen therein, according to the present disclosure, has an effect of preventing luminance from being degraded by the coupling effect, by changing the arrangement structure of the touch electrodes with different sizes in the row direction or in the column direction.

Figure 8:
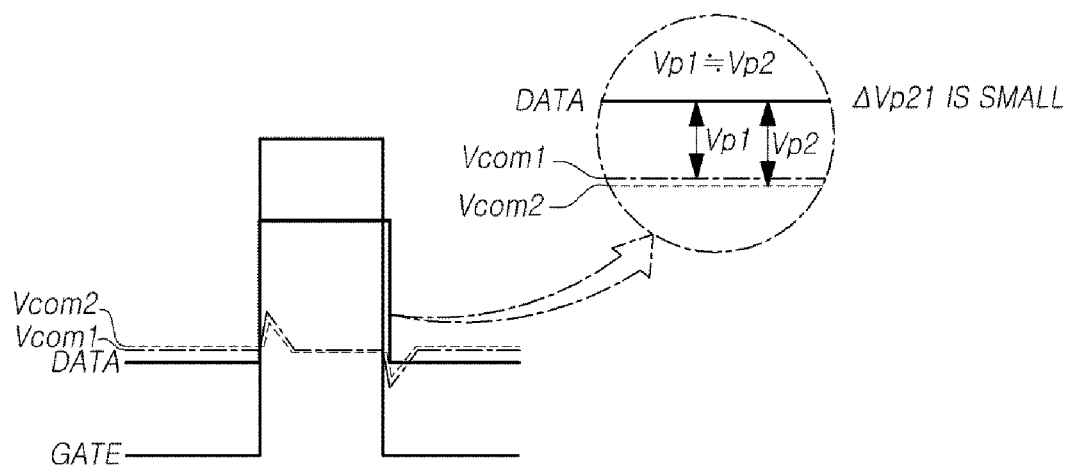
FIG. 8 is a diagram illustrating a reduced voltage difference between touch electrodes of the display device having a touch screen therein according to the present disclosure.

FIG. 8 is a diagram illustrating a reduced voltage difference between touch electrodes of the display device having a touch screen therein according to the present disclosure. Referring to FIGS. 7 and 8, although the first touch electrode TE1 is larger than the second touch electrode TE2, the difference in capacitance between the first and second touch electrodes TE1 and TE2 becomes smaller than that illustrated in FIG. 6A since the difference between the number of sub-pixels SP in the vertical column direction that correspond to the first touch electrode TE1 and the number of sub-pixels SP in the vertical column direction that correspond to the second touch electrode TE2 is equal to one.

Further, since the second touch electrodes TE2 with a relatively small size are arranged in the first row and in the j-th row of the display panel 110 and the first touch electrodes TE1 are arranged between the first row and the j-th row, the first common voltage Vcom1 supplied to the first touch electrodes TE1 does not increase to a high level by the coupling effect.

Since the variation of the common voltage of the first touch electrode TE1 and the second touch electrode TE2 is reduced as described above, the potential of the pixel voltage Vp2 of the second touch electrode TE2 is substantially the same as that of the pixel voltage Vp1 of the first touch electrode TE1 (Vp1≈Vp2;ΔVp21 is small).

Accordingly, the present disclosure can reduce luminance degradation that occurs in the area where the first touch electrodes TE1 with a large size are arranged.

Figure 9:
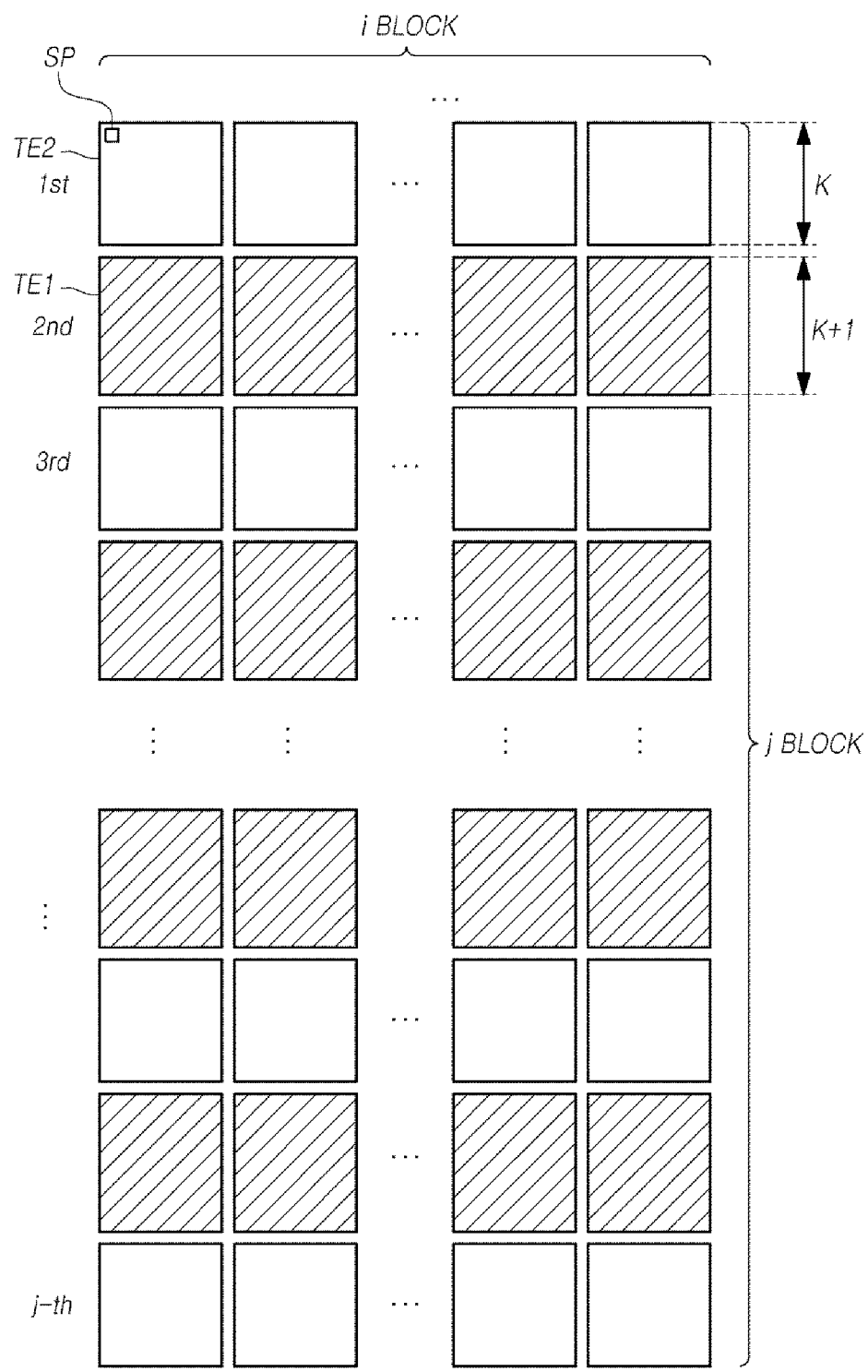
FIGS. 9 to 11 are diagrams illustrating touch electrode structures of the display device having a touch screen therein, according to other embodiments of the present disclosure.
Figure 10:
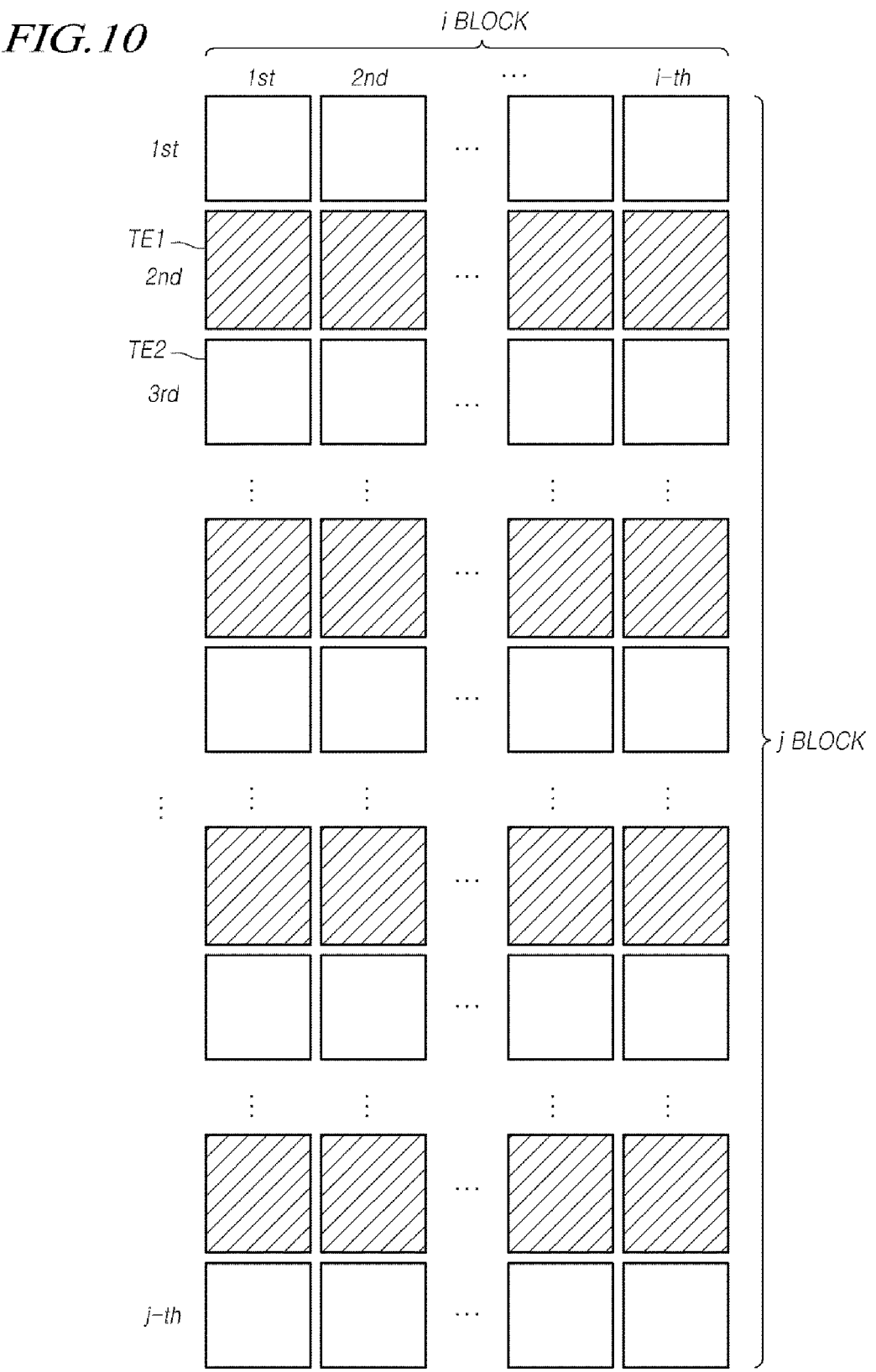

FIGS. 9 to 10 are diagrams illustrating touch electrode structures of the display device having a touch screen therein, according to other embodiments of the present disclosure.

This embodiment in FIG. 9 is similar to the embodiment in FIG. 7; and however, the number of sub-pixels corresponding to the touch electrode in the second region is larger than or equal to the number of sub-pixels corresponding to the touch electrode in the first region and the number of sub-pixels corresponding to the touch electrode in the third region, and the number of sub-pixels corresponding to each touch electrode in the second region is varied.

In practice, touch electrodes include first touch electrodes TE1 each corresponding to relatively-small number of sub-pixels, and second touch electrodes TE2 each corresponding to a relatively-large number of sub-pixels. As shown in FIG. 9, a row of second touch electrodes TE2 is arranged in the first row; a row of first touch electrodes TE1 is arranged in the second row; another row of second touch electrodes TE2 is arranged in the third row; another row of first touch electrodes TE1 is arranged in the fourth row, and the arrangement of the other rows of touch electrodes in the second region can be deduced by analogy and have no more related descriptions hereafter.

Namely, when first touch electrodes TE1 have to be arranged in the second row, a row of second touch electrodes TE2 may be arranged in the first row.

Further, when there is a large difference between the number of sub-pixels that correspond to first touch electrodes TE1 and the number of sub-pixels that correspond to second touch electrodes TE2 in the display panel 110, the number of rows of first touch electrodes TE1 with a large size has to be larger than that illustrated in FIG. 7 in order to make a difference between the number of sub-pixels corresponding to the vertical column of the first touch electrodes TE1 and the number of sub-pixels corresponding to the vertical column of the second touch electrodes TE2 equal to one.

When the number of first touch electrodes TE1 be arranged increases, the first touch electrodes TE1 and the second touch electrodes TE2 may be alternately arranged in units of rows to reduce a degradation in luminance.

Figure 11:
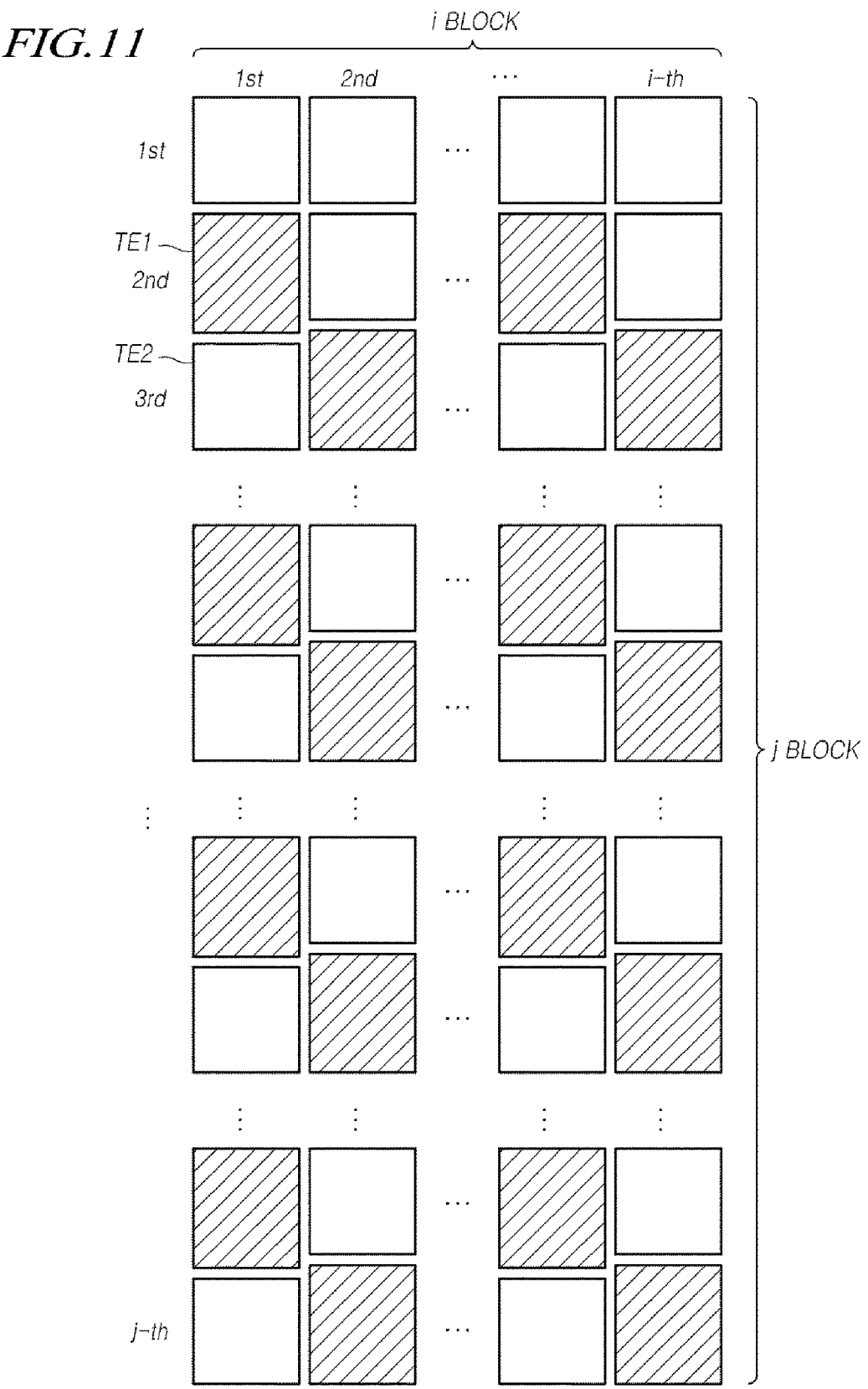

FIG. 11 illustrates another embodiment in which the active area includes a first region and a second region, the number of sub-pixels corresponding to the touch electrode in the second region is larger than or equal to the number of sub-pixels corresponding to the touch electrode in the first region, the number of sub-pixels corresponding to each touch electrode in the first region is the same, the number of sub-pixels corresponding to each touch electrode in the second region is the same or varied.

In practice, the touch electrodes in the second region include first and second touch electrodes TE1 and TE2 which are alternately arranged in the same row and in the same column to minimize a degradation in luminance.

Since the same number of first touch electrodes TE1 are basically added to the columns (i columns), the number of first touch electrodes TE1 arranged in each column is constant.

However, as opposed to those illustrated in FIGS. 7, 9, and 10, the first touch electrodes TE1 and the second touch electrodes TE2 are alternately arranged in the column direction and in the row direction in FIG. 11 such that the capacitance difference caused by the difference in size between the electrodes is cancelled out by the touch electrodes arranged in the surrounding area, thereby minimizing non-uniform luminance.

As described above, the display device having a touch screen therein, according to the present disclosure, can improve a degradation in luminance caused by a difference in size between the touch electrodes, by minimizing the deviation in size between the touch electrodes with different sizes among the touch electrodes arranged in the display panel.

In addition, the display device having a touch screen therein, according to the present disclosure, can prevent luminance from being degraded by the coupling effect, by changing the arrangement structure of the touch electrodes with different sizes in the row direction or in the column direction.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A display device, comprising:
   an active area on an array substrate;
   a plurality of sub-pixels in the active area;
   a plurality of first and second touch electrodes on a same plane functioning as a common electrode, arranged in a matrix form and each of the first and second touch electrodes corresponding to the plurality of sub-pixels, a plurality of sensing lines disposed at a different layer from a layer where the first and second touch electrodes are disposed, each of the plurality of sensing lines is electrically connected to the first touch electrode or the second touch electrode, and at least part of the each of the plurality of sensing lines overlaps the first touch electrode or the second touch electrode, and a touch circuit supplying a touch driving signal to the first and second touch electrodes and receiving a touch sensing signal from the first and second touch electrodes where the touch driving signal is supplied, wherein the first touch electrode has a different size from the second touch electrode.

2. The display device of claim 1, wherein the number of sub-pixels corresponding to the first touch electrode is larger than the number of sub-pixels corresponding to the second touch electrode.

3. The display device of claim 2, wherein the sub-pixels are arranged in a matrix form, the number of sub-pixels in the column direction corresponding to the first touch electrode is k+n, the number of sub-pixels in the column direction corresponding to the second touch electrode is k, and n is a natural number of 1 or 2.

4. The display device of claim 2, wherein at least one of the plurality of the second touch electrodes is disposed between two first touch electrodes.

5. The display device of claim 2, wherein the first touch electrodes are disposed at the uppermost region and the lowermost region of the active area, and the second touch electrodes are disposed at the central region of the active area.

6. The display device of claim 2, wherein the number of sub-pixels corresponding to each of the first touch electrodes is the same, and the number of sub-pixels corresponding to each of the second touch electrodes is the same.

7. The display device of claim 1, wherein the number of sub-pixels corresponding to the first touch electrode is smaller than the number of sub-pixels corresponding to the second touch electrode.

8. The display device of claim 7, wherein the sub-pixels are arranged in a matrix form, the number of sub-pixels in the column direction corresponding to the second touch electrode is k+n, the number of sub-pixels in the column direction corresponding to the first touch electrode is k, and n is a natural number of 1 or 2.

9. The display device of claim 7, wherein at least one of the plurality of the second touch electrodes are disposed between two first touch electrodes.

10. The display device of claim 7, wherein the first touch electrodes are disposed at the uppermost region and the lowermost region of the active area, and the second touch electrodes are disposed at the central region of the active area.

11. The display device of claim 7, wherein the number of sub-pixels corresponding to each of the first touch electrodes is the same, and the number of sub-pixels corresponding to each of the second touch electrodes is the same.

12. The display device of claim 1, wherein the display device includes one of liquid crystal displays (LCDs), plasma display panels (PDPs), organic light emitting display devices (OLEDs).

13. A display device having a built-in touch screen, comprising:

a plurality of gate lines and data lines vertically crossing each other on an array substrate;

a plurality of sub-pixels where the gate lines and the data lines cross each other;

a plurality of touch electrodes arranged in row and column directions on a same plane, corresponding to the sub-pixels, and each touch electrode functioning as a common electrode, a plurality of sensing lines disposed at a different layer from a layer where the touch electrodes are disposed, each of the plurality of sensing lines is electrically connected to each of the touch electrodes, and at least part of the each of the plurality of sensing lines overlaps the touch electrodes, and a touch circuit supplying a touch driving signal to each of the plurality of touch electrodes and receiving a touch sensing signal from each of the plurality of touch electrodes where the touch driving signal is supplied, wherein the touch electrodes include first and second touch electrodes, each first touch electrode has an area different from each second touch electrode, the first touch electrodes are arranged at least at the first and last locations in the column direction, so that the first and second touch electrodes are adjacent to each other.

14. The display device of claim 13, wherein the first and second touch electrodes are arranged to adjacent to each other both in the row and column directions except for that the first touch electrodes are arranged at the uppermost row.

15. The display device of claim 13, wherein the number of sub-pixels in the column direction corresponding to each first touch electrode is k+n, the number of sub-pixels in the column direction corresponding to the second touch electrode is k, and n is a natural number of 1 or 2.

* * * * *